United States Patent
Cromer et al.

(10) Patent No.: US 6,282,642 B1
(45) Date of Patent: Aug. 28, 2001

(54) SYSTEM FOR PRESETTING A FIRST OR SECOND REMOTE BOOT PROTOCOL BY A COMPUTER REMOTELY RECEIVING AND STORING A BOOT PARAMETER PRIOR TO BEING POWERED ON

(75) Inventors: Daryl Carvis Cromer, Cary; Christopher Britton Gould, Raleigh; Howard J. Locker, Cary; David B. Rhoades, Apex; James Peter Ward, Raleigh, all of NC (US)

(73) Assignee: International Business Machines Corporation

(*) Notice: Subject to any disclaimer, the term of this patent is extended or adjusted under 35 U.S.C. 154(b) by 0 days.

(21) Appl. No.: 09/195,466

(22) Filed: Nov. 18, 1998

(51) Int. Cl.$^7$ .............................. G06F 9/445; G06F 15/177
(52) U.S. Cl. ................................. 713/2; 713/1; 713/310
(58) Field of Search ................................ 713/2, 300, 310, 713/1; 710/11

(56) References Cited

U.S. PATENT DOCUMENTS

| | | | |
|---|---|---|---|
| 5,396,636 | * | 3/1995 | Gallagher et al. .................. 713/323 |
| 5,809,118 | * | 9/1998 | Carmello et al. ................ 379/102.02 |
| 5,860,001 | * | 1/1999 | Cromer et al. ............................ 713/1 |
| 5,978,912 | * | 11/1999 | Rakavy et al. ............................ 713/2 |
| 6,038,689 | * | 3/2000 | Schmidt et al. ......................... 714/48 |
| 6,085,328 | * | 7/2000 | Klein et al. ............................ 713/310 |

* cited by examiner

Primary Examiner—Thomas Lee
Assistant Examiner—Ilwoo Park
(74) Attorney, Agent, or Firm—John B. Schelkopf

(57) ABSTRACT

Described is a computer system which can be pre-set over a network to boot to a first or second remote boot protocol prior to being powered on over the network. The system is coupled to a remote computer via a data communication link. The system includes a communication subsystem for communicating data with the computer system. The communication subsystem is supplied with auxiliary power and is operative to communicate with the computer system regardless of whether the computer system is in a normal operating state. The remote computer includes a program for sending a first packet to the computer system via the communication link. The first packet contains a boot parameter which is indicative of the first or second remote boot protocol. The computer system is operative to receive the first packet via the communication subsystem and store the boot parameter in a memory thereof without powering on. The memory is accessed by BIOS during a network boot sequence and the system will boot in accordance with the specified boot protocol stored in the memory.

7 Claims, 5 Drawing Sheets

SYSTEM FOR PRESETTING A FIRST OR SECOND REMOTE BOOT PROTOCOL BY A COMPUTER REMOTELY RECEIVING AND STORING A BOOT PARAMETER PRIOR TO BEING POWERED ON

RELATED APPLICATIONS

The present invention is believed to be related to the following issued patent and pending applications:

U.S. Pat. No. 5,396,636, "REMOTE POWER CONTROL VIA DATA LINK"; and application Ser. No. 08/858,873, filed May 19, 1997, now U.S. Pat. No. 5,860,001, and entitled "COMPUTER SYSTEM HAVING AT LEAST TWO BOOT SEQUENCES".

BACKGROUND OF THE INVENTION

1. Field of the Invention

The present invention relates to computer systems coupled to a network and more particularly, to a computer system which allows a network administrator to pre-set the computer system's boot sequence prior to turning the system on over the network.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, a fixed disk storage drive (also known as a "hard drive"), a so-called "mouse" pointing device, and an optional printer. One of the distinguishing characteristics of these systems is the use of a motherboard or system planar to electrically connect these components together. Examples of such personal computer systems are IBM's PC 300 series and IBM's Aptiva Series.

It is normal to custom configure the system unit of a computer system for a user at a dealer, a corporate configuration center, or at the user site. When done at the dealer or at a configuration center the resources and skills needed are available but the computer must be removed from the packaging, set up, configured with BIOS and a program image and then repackaged to be sent to the end user. Typically large accounts roll out systems through configuration centers, which flash BIOS and download an operating system (OS) and application suite at the configuration center. There are several industry solutions to accomplish this task. IBM Corporation has delivered a product called LAN Client Control Manager (LCCM), which is remote program load (RPL) based. Intel Corporation has delivered a product LAN Control Manager (LCM) which is dynamic host configuration protocol (DHCP) based.

The LCCM is a RPL server and is a good roll out tool. In operation, the client system performs a RPL to the LCCM server. The server accepts the client and compares the client identification to a list of known clients. As long as the client is a known client, the server sends down an image to the client. The client system then runs the image which can be for example, a flash update or operating system installation.

The LCM is a DHCP server and is a good maintenance tool. In operation, the client uses DHCP to obtain an IP address from the LCM server. The LCM server displays a listing of the following options to the client: 1) boot local, 2) upgrade flash, 3) upgrade operating system and 4) run virus scan. The user on the client then selects one of these options. If a local boot is selected, the client exits DHCP mode. If any of the other image down load options is selected then the client will boot to the LCM server.

One of the first operations to be performed when a computer is turned on is to load initial programs into the main or system memory to provide the basic tools and utilities which define the operations of the computer system. Such initial programs include the BIOS, the operating system and particular applications defined by initialization control information. The initialization control information which causes an initial program load (IPL) includes Power On Self Test (POST) code, IPL control logic (often termed the boot record) and control data. The POST code can be stored in BIOS in a flash memory.

When the computer system is powered on from its power switch, the POST code is executed and the IPL can occur, for example, from a floppy diskette drive, a CD-ROM drive or the hard drive. In addition, if the computer is provided with integrated 10/100 Fast Ethernet with Alert on LAN or a suitable network adapter such as, for example, an IBM Auto Wake Token Ring PCI adapter with Alert on LAN and is connected to a computer network such as, for example, a local area network (LAN), there can be another potential source for the IPL operation. Namely, the IPL can occur from a remote storage location in a LAN server computer system (often called a remote IPL or RPL). Alternatively, the computer coupled to a network can use dynamic host configuration protocol (DHCP) as a remote source for the IPL operation. If RPL is used, the application of choice is a RPL server or LCCM. On the other hand, if DHCP is used, the application of choice is LCM or a Windows NT server.

Using the computer's ROM setup utility, a user can manually select whether to IPL using RPL or DHCP. Computer systems should have the flexibility to support both the RPL and the DHCP environment. However, the systems need to be set to the proper environment prior to attempting to manage the system. This results in a manual operation of changing a BIOS setting to RPL or DHCP. The BIOS setting can be changed manually by, for example, opening a BIOS setup menu for "boot sequence", selecting "Ethernet" and then selecting boot type (RPL, DHCP or none). Similarly, for adapter cards the boot sequence can be chosen manually by opening a "boot sequence" menu and selecting the boot type.

A conventional solution is to use an algorithm to have the system auto detect on the first power cycle whether to RPL or DHCP. The algorithm first attempts a DHCP boot and if successful sets the default to DHCP. If no contact is made to a DHCP server within a predetermined period of time, then the algorithm will set the default to RPL and attempt an RPL boot. However, this solution has several limitations. In environments with both RPL and DHCP servers, the algorithm will select DHCP. In addition, this solution is an awkward method to alternate between RPL and DHCP as it requires LCCM (RPL based) to change CMOS to setup to DHCP or LCM (DHCP based) to change CMOS to setup RPL.

It is therefore desirable to provide a computer system coupled to a network that allows a network administrator to set the system's boot sequence over the network prior to turning the system on over the network and performing a remote program load.

SUMMARY OF THE INVENTION

The present invention is directed to a computer system which can be pre-set over a network to boot to a first or second remote boot protocol prior to being powered on over the network. The system is coupled to a remote computer via a data communication link and is adapted to transfer data over the communication link. The computer includes a communication subsystem for communicating data with the computer system. The communication subsystem is supplied with auxiliary power and is operative to communicate with the computer system regardless of whether the computer system is in a normal operating state. The remote computer system includes a program for sending a first packet to the computer system via the communication link. The first packet contains a boot parameter which is indicative of the first or second remote boot protocol. The computer system is operative to receive the first packet via the communication subsystem and store the boot parameter in a memory thereof without powering on. The memory is accessed by BIOS during each network boot sequence and the system will boot in accordance with the specified boot protocol stored in the memory.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Figure 1:
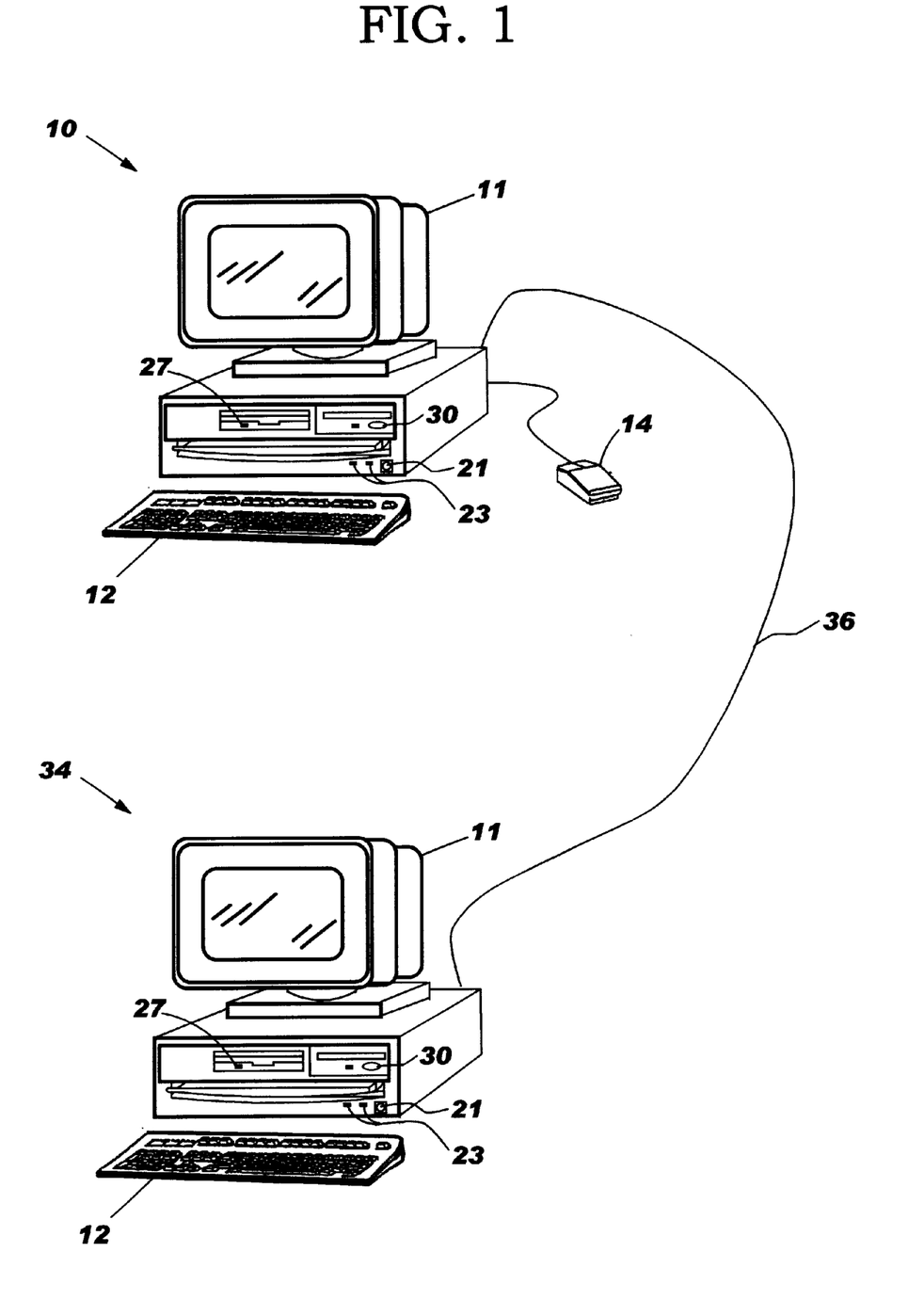
FIG. 1 is a perspective view of a personal computer embodying this invention and a LAN station remote computer system.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

Figure 2:
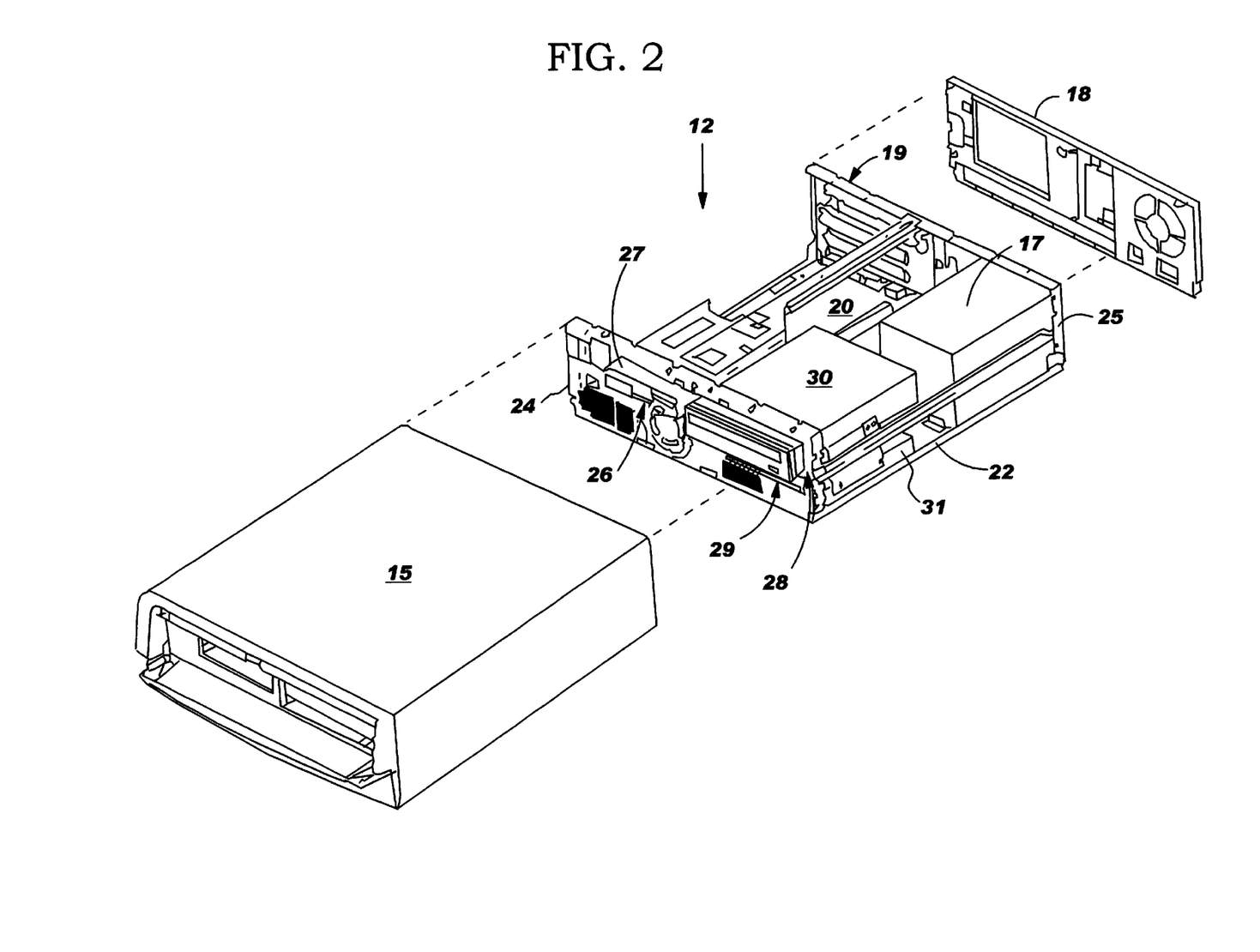
FIG. 2 is an exploded perspective view of certain elements of the personal computer of FIG. 1 including a chassis, a cover, an electromechanical direct access storage device and a planar board and illustrating certain relationships among those elements.

The system 10 has a power supply 17, a power button 21, also herein referred to as switch 21, and LEDs 23 for power indication and hard disk activity. The chassis 19 has a base indicated at 22, a front panel indicated at 24, and a rear panel indicated at 25 (FIG. 2). The front panel 24 defines at least one open bay (and in the form illustrated, three bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
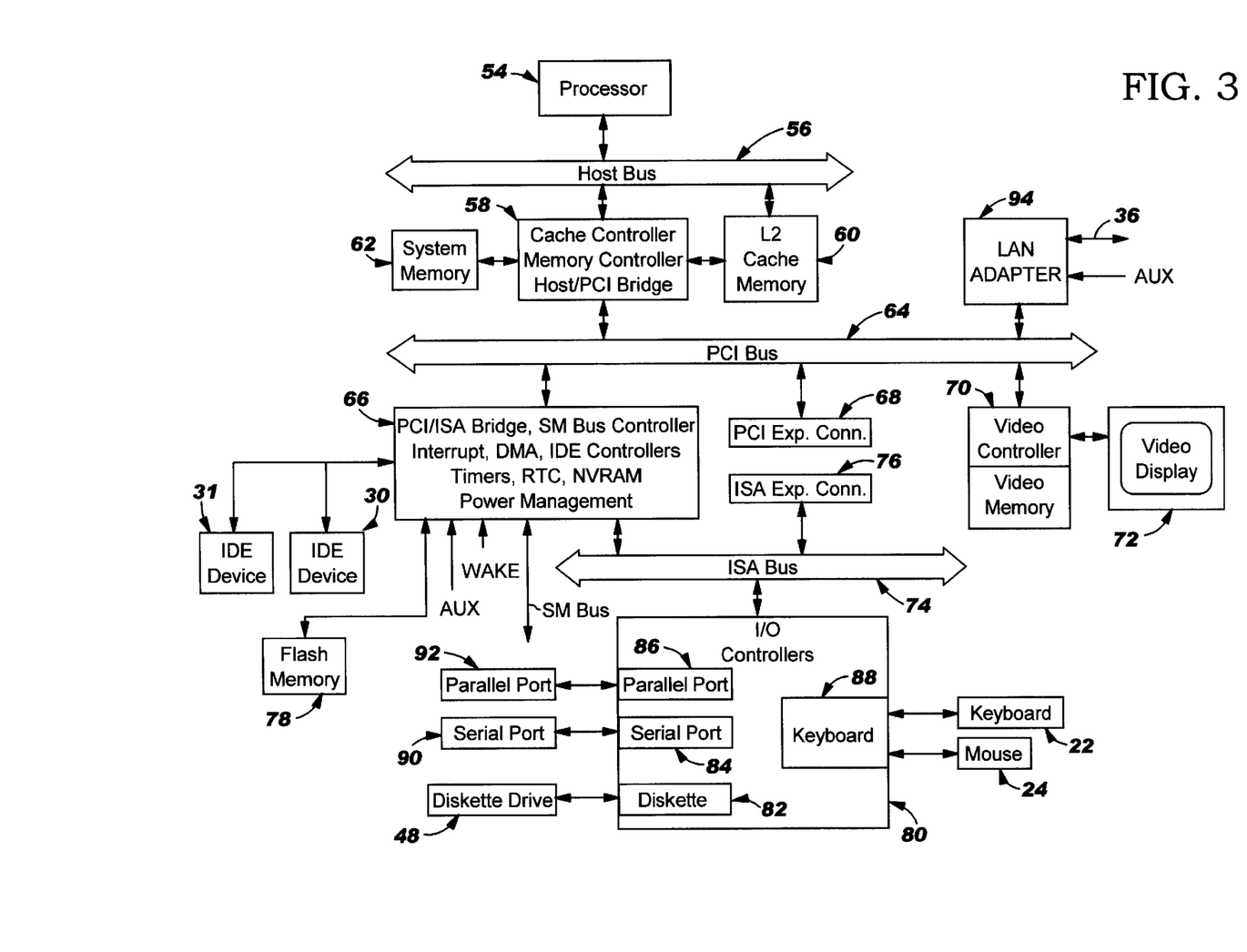
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the 10 expansion connectors and other hardware of the personal computer system. Connected to the planar 20 is the system CPU or processor 54 which is connected directly to a high speed CPU host bus 56. A first system core logic chipset 58 and L2 cache memory 60 are also connected to the host bus 56. The first core logic chipset 58 includes a memory control unit, a L2 cache controller and a peripheral component interconnect (PCI) bridge. The memory control unit is further connected to a volatile random access memory (RAM) 62. The RAM memory 62 is composed of one or more memory modules. The memory controller includes the logic for mapping addresses to and from the microprocessor 54 to particular areas of RAM 62. The cache controller is operatively coupled to the L2 cache memory 60.

The first core chipset 58 can be, for example, a 440 BX chip which is sold by Intel Corporation. The PCI bridge within chipset 58 provides an interface between the local bus 56 and a PCI bus 64. Connected to the PCI bus 64 is a second core chipset 66 and a plurality of PCI expansion connectors 68 for receiving PCI bus compatible peripheral cards. One such peripheral card is a video controller 70. The video controller 70 includes video memory and is coupled to the monitor or video display terminal 11. The chipset 66 can be, for example, an PIIX4 chip which is also sold by Intel Corporation.

The chipset 66 contains a bus control and timing unit, a plurality of timers, an interrupt controller, a direct access memory (DMA) unit, nonvolatile CMOS RAM, also herein referred to as NVRAM, a CMOS real-time clock (RTC), Flash memory interface, a PCI/ISA bridge, an integrated drive electronics (IDE) controller, and power management circuitry. The PCI/ISA bridge provides an interface between the PCI bus 64 and an optional feature or expansion bus such as the Industry Standard Architecture (ISA) bus 74. Connected to the ISA bus 74 are a plurality of ISA expansion connectors 76 for receiving ISA adapter cards (not shown). ISA adapter cards can be pluggably connected to the ISA expansion connectors 76 and may provide additional 10 devices or memory for the system 10.

Attached to the chipset 66 is a flash memory (FM) module or chip 78. Flash memory module 78 contains microcode that system 10 will execute on power on. The flash memory 78 is an electrically erasable programmable read only memory (EEPROM) module or chip and includes the BIOS that is used to interface between the 10 devices and the operating system. BIOS stored in memory 78 can be copied into RAM 62 to decrease the execution time of BIOS.

The IDE controller 66 provides for the attachment of IDE compatible storage devices such as the fixed disk drive 31 and CD-ROM drive 30.

The real-time clock is used for time of day calculations and the NVRAM is used to store system configuration data. That is, the NVRAM will contain values which describe the present configuration of the system 10. For example, NVRAM 66 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Power management logic within chipset 66 is for changing the system 10 between various power states (e.g., off, suspend and normal operating states). The circuitry is supplied with auxiliary power (AUX) from the power supply 17 when the system 10 is in the off state so that it can monitor events which cause the system 10 to turn on. For example, the circuitry 66 also includes a timer which is configurable by a user to expire after a predetermined period of time. When the timer expires, the circuitry 66 will cause the system 10 to change from the off state to the normal operating state. The circuitry 66 also provides a controller for a low speed serial bus called a System Management (SM) bus which will be described in more detail below.

Coupled to the ISA bus 74 is a multi-function 10 controller 80 such as, for example, a National Semiconductor PC87307. The 10 controller 80 contains a variety of 10 adapters and other components such as the diskette adapter 82, serial adapter 84, a parallel adapter 86 and keyboard controller 88. The diskette adapter 82 provides the interface to the diskette drive 27. The serial adapter 84 has an external port connector 90 for attachment of external devices such as modems (not shown). The parallel adapter 86 has an external port connector 92 for attachment of external devices such as printers (not shown). The keyboard controller 88 is the interface for the keyboard connector 22 and the mouse connector 24.

A communication subsystem 94 can be coupled to either the PCI bus 64 or ISA bus 74 for allowing system 10 to communicate (i.e., transmit/receive data) with a remote computer or server 34 (FIG. 1) over a LAN via a connection or link 36. The communication subsystem 94 can be, for example, a LAN adapter or a LAN connection embedded on the planar 20. The subsystem 94 will described in more detail below.

The LAN adapter is supplied with auxiliary power (AUX) from the power supply 17 when the system 10 is off. When the LAN adapter 94 is set in a wake up mode it scans all incoming frames from the LAN addressed to system 10 for a specific data frame. If the LAN adapter scans a frame and does not find the specific data frame, it discards the frame and takes no further action. If the LAN adapter 94 detects the specific data frame, however, it alerts the power management circuitry 66 via a wake on LAN signal to power on the system 10 (i.e., change from the off state to the normal operating state). The LAN adapter can be, for example, an IBM Auto Wake Token-Ring PCI Adapter with Alert on LAN.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 54 could be an Intel Pentium or Pentium II processor, Cyrix 586-P75 processor or Advanced Micro Devices K6 processor or any other suitable microprocessor.

The microcomputer system 10 is shown with 16 megabytes of system memory 62. It is understood that additional memory can be interconnected as represented in FIG. 3 by installing additional or higher-density memory modules. For purposes of illustration only, the present invention is described with reference to the 16 megabytes memory configuration.

Referring back to FIG. 1, there is shown the local computer system 10 along with a perspective view of a remote personal computer 34. While not here shown or described in detail, the remote computer system 34 has components and attributes like those illustrated and described with regard to FIG. 3 and those additional elements appropriate to provide the non-volatile storage mentioned, as is known to the person skilled in the appropriate arts. The remote computer system or remote management system 34 can be, for example, a client, a personal computer or a server. A storage means associated with the remote computer 34 can be a non-volatile means such as a direct access storage device (DASD) in the form of a hard disk device, diskette, compact disc or the like.

The local and remote computers 10, 34 are associated one with the other through some form of local area network (LAN) or the like, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer 34 may be some computer having capabilities other than those ascribed herein to a "personal computer", and possibly beyond those capabilities.

While the term "remote" is used with reference to the computer system 34 through which the LAN station local computer system 10 accesses BIOS, that term is used in the sense of indicating separation, rather than in the sense of indicating a large physical distance between the systems. In fact, such system may be physically adjacent in some network arrangements.

One embodiment of the present invention will now be described while referring to FIG. 4. The LAN subsystem 94 includes a Media Access Controller (MAC) 96. The MAC 96 serves as an interface between a shared data path (e.g., media independent interface (described below) and the PCI bus 64 (or ISA bus 74 if subsystem 94 were connected to the ISA bus 74). The MAC 96 performs a number of functions involved in the transmission and reception of data packets. For example, during the transmission of data, the MAC 96 assembles the data to be transmitted into a packet with address and error detection fields. Conversely, during the reception of a packet, the MAC 96 disassembles the packet and performs address checking and error detection. In addition, the MAC 96 typically performs encoding/decoding of digital signals transmitted over the shared path and performs preamble generation/removal as well as bit transmission/reception. The MAC 96 can be for example, an Intel 82557 chip.

The LAN subsystem 94 further includes a media independent interface (MII) which is a local bus between the MAC 96 and a physical layer 98. The MII is a specification of signals and protocols which formalizes the interfacing of a 10/100 Mbps Ethernet Media Access Controller 96 to the underlying physical layer 98.

The physical layer 98 can be a fully integrated device supporting 10 and 100 Mb/s CSMA/CD Ethernet applications. The physical layer 98 receives parallel data from the MII local bus and converts it to serial data for transmission through network connector 95 and then over cable 36. The physical layer 98 is also responsible for wave shaping and provides analog voltages to cable 36. The physical layer 98 can be for example, an Integrated Circuits Systems 1890 chip. The physical layer 98 includes auto-negotiation logic that has three main purposes. First, to determine the capabilities of the main computer 34. Second, to advertise its own capabilities to the main computer 34. And third, to establish a connection with the main computer 34 using the highest performance common connection technology.

The LAN subsystem 94 further includes network connector 95 which is the physical interface between the subsystem 94 and cable 36. The network connector 95 can be, for example, an RJ45 type connector or other form factor.

The LAN subsystem 94 is powered by auxiliary voltage (e.g., AUX) which is present so long as the system 10 is connected to AC power. Accordingly, the LAN subsystem 94 is able to send/receive packets over cable 36 when the system 10 is in any power state (normal operating, sleep, standby, suspend, off, etc.). This allows the system 10 to support wake on LAN (WOL) and send/receive packets regardless of power state. This has the advantage that the present invention does not require the system 10 to be powered to a normal operating or ON state to operate.

The present invention is directed to a system and method for allowing a system administrator to set the system 10 to boot to either RPL or DHCP prior to turning on the system 10. This allows a network administrator with remote boot to pre-set depending on the type of server available (e.g., if RPL is used, the application of choice is a RPL server or LCCM, while if DHCP is used, the application of choice is LCM or a Windows NT server). Briefly, the LAN software application running on the remote computer system or server 34 issues a special packet to system 10 which contains a status byte to indicate boot type. The system 10 receives the packet via the Ethernet subsystem 94 and stores the desired boot parameter in a register that is accessed by BIOS during the boot sequence.

The software application can either be a stand alone application or integrated into IBM's Netfinity management software or Intel's LANDesk management software.

Figure 4:
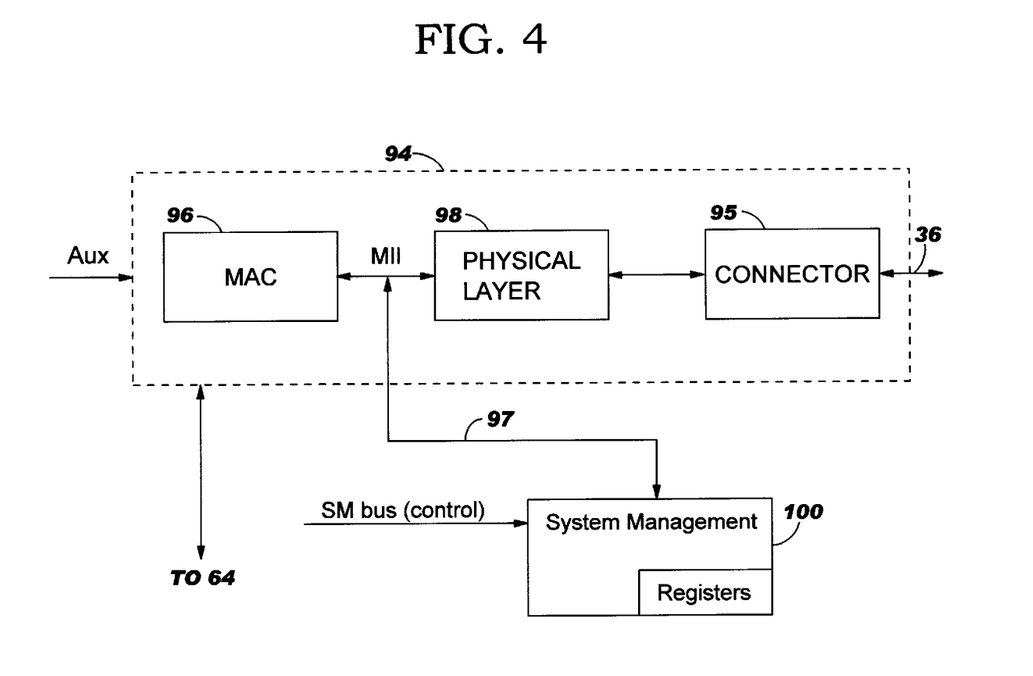
FIG. 4 is a schematic diagram of certain components of the personal computer of FIGS. 1 and 2 in accordance with the present invention.

Referring to FIG. 4, a logic circuit 100 is coupled to the MII bus 97. The logic circuit 100 includes several functional areas. The system management portion is responsible for receiving and decoding management packets sent to the system 10, while the system is turned off. When the system is on, Ethernet packets are handled by MAC 96 and sent to the operating system. While the system 10 is off, system management ASIC 100 receives and decodes the packets. The registers in logic 100 are used to store a desired boot parameter and are accessed by BIOS during a boot sequence. Logic circuit 100 supports the SM bus interface and is connected to SM bus controller in circuitry 66. The SM bus is a low speed serial bus that allows transfers of data between the controller 66 and the logic 100. POST can access registers in logic 100 by sending read and write commands to controller 66.

The logic 100 is shown as connecting to LAN subsystem 94 via the MII bus 97. It is understood that logic 100 could be connected to LAN subsystem 94 through a side-band bus such as the System Management Bus or a proprietary bus. The LAN subsystem 94 could contain logic 100 internal to the MAC without requiring external logic. For purposes of illustration only, the present invention is described with reference to the logic connected via the MII bus.

Figure 5:
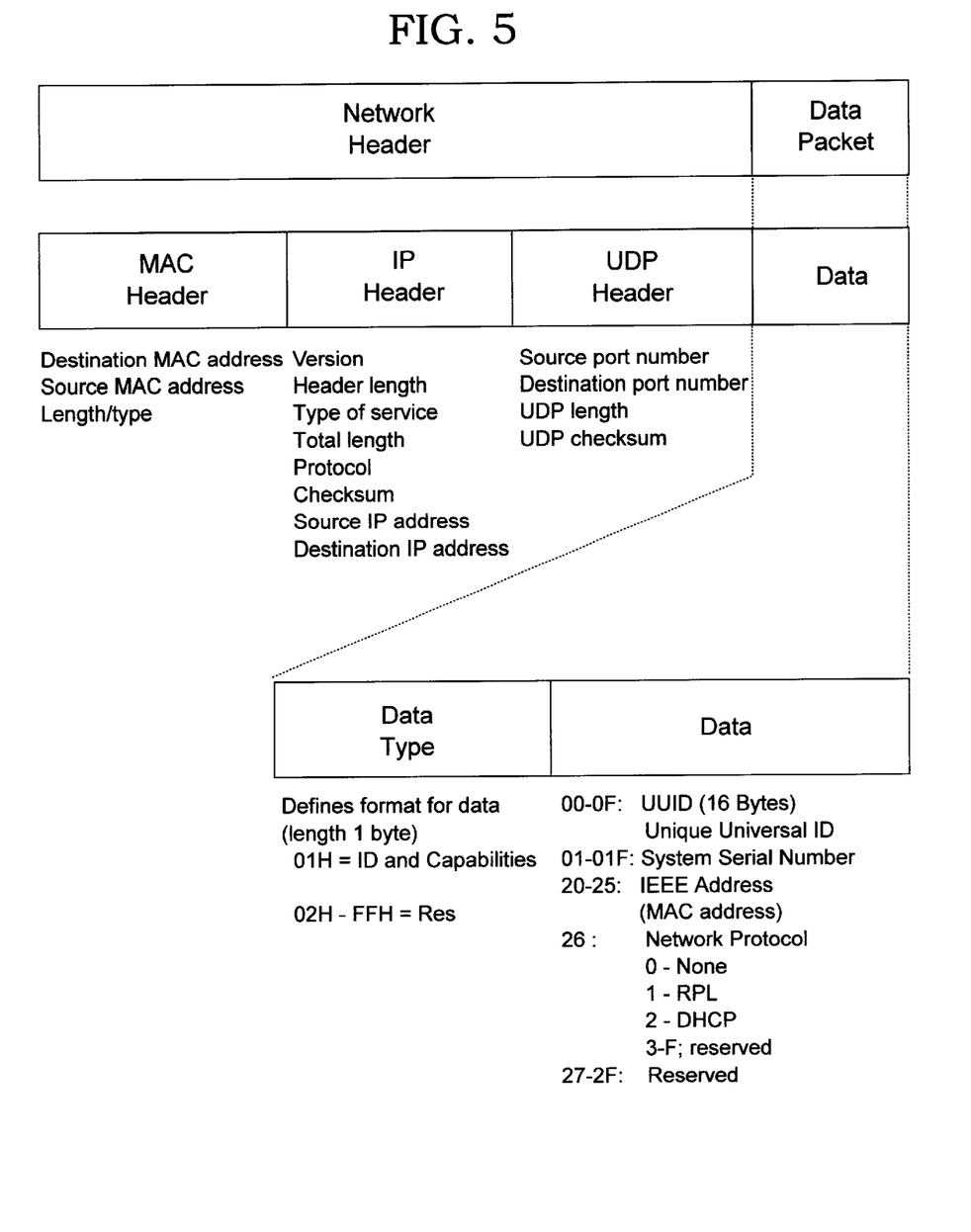
FIG. 5 is a diagrammatic representation of a packet which is sent by the remote computer of FIG. 1 in accordance with the present invention.

A packet including a network header and data packet that can be sent over an Ethernet network is indicated in FIG. 5. The network header includes a MAC header, an IP header and UDP header as is known to provide addresses, identifiers and other information for assuring correct transfer. The data packet includes a status byte to indicate boot type. For the transmission packet created by main computer 34, the data type and data patterns indicated for transmission in FIG. 5 are preferably followed according to the invention.

Referring to FIG. 5, the data type is first used to set up a category of data and then a data portion provides specific information. The data type for this invention indicates the type of network connection. The data patterns are defined as the (1) Universal Unique ID (UUID) which is used by main computer 34 to reference computer system 10, (2) serial number of system 10 which is used by main computer 34 to determine the model of computer system 10, (3) IEEE Address which is assigned by IEEE to uniquely identify computer 10 on a network, and (4) requested network protocol which identifies if the POST should load the RPL or DHCP protocol when booting to the network. It should be understood that the data packet and data patterns shown in FIG. 5 are by way of example only, and other packets and patterns can be used with the present invention.

In operation, the network administrator can select either RPL or DHCP prior to booting system 10 via WOL. The administrator makes this selection based on 1) the type of network servers available (RPL, DHCP, or both) and 2) the type of servers required (LCM or LCCM). The administrator will send the packet of FIG. 5 via the server software application over cable 36 to system 10. Since the LAN subsystem 94 is powered by AUX it will receive and process the packet. More specifically, the logic 100 will store the desired boot parameter (RPL or DHCP) from the packet in the register portion. Next, the administrator can send a WOL packet to turn system 10 on to a normal operating state. When the system powers on, BIOS will access the register in logic 100 and determine which protocol (RPL or DHCP) to load when booting to the network.

For a more detailed description of the WOL power on method, see the above mentioned related applications which are hereby incorporated by reference.

After the system 10 is powered on via WOL, the power on self test (POST) will be executed out of flash memory 78. Most functions performed by POST are well known to those skilled in the art of the present invention and are not described below. Only those functions which are relevant to the present invention are described below.

POST will check the value of the network protocol in register 100 to determine if the network administrator has requested a type of network boot protocol. If there is a request, POST will load either the RPL or DHCP protocol for network boots and update CMOS to reflect the value. If there is not a request, then POST will use the value already in CMOS. The system 12 will then boot in accordance with the specified boot protocol stored in CMOS.

One advantage of the present invention is that it allows for easier network management of computer systems. For example, a network administrator can change the boot preference to either RPL or DHCP over the network without having to manually setup RPL or DHCP. The administrator can change between RPL/LCCM and DHCP/LCM as often as required. In addition, the system 10 can be set up to RPL or DHCP prior to turning the system 10 on via a wake up packet over a LAN.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system which can be pre-set over a network to boot to a first or second remote boot protocol prior to being powered on over the network, said computer system being coupled to a remote computer via a data communication link, said computer system comprising:

said computer system being adapted to transfer data over said communication link, a communication subsystem for communicating data with said computer system, said communication subsystem being supplied with auxiliary power and being operative to communicate with said computer system regardless of whether said computer system is in a normal operating state, said remote computer system having means for sending a first packet to said computer system via said communication link, said first packet containing a boot parameter which is indicative of said first or second remote boot protocol, said computer system being operative to receive said first packet via said communication subsystem and store said boot parameter in a memory thereof without powering on, said memory being accessed by BIOS during a boot sequence.

2. The computer system of claim 1, further including a logic circuit coupled to said communication subsystem for storing said boot parameter which can be accessed by BIOS during a boot sequence.

3. The computer system of claim 2, wherein said means includes a program which sends said first packet to said at least one computer system via said communication link and said remote computer is further operative to send a wake up packet to said computer system after sending said first packet.

4. The computer system of claim 3, wherein said computer system is further operative to receive said second packet and execute a power on self test wherein said boot parameter is used to determine whether said first or second remote boot protocol is used.

5. The computer system of claim 1, wherein said first remote boot protocol is RPL and said second remote boot protocol is DHCP.

6. The computer system of claim 1, wherein a network connector is a connector selected from the group consisting of a LAN adapter and a LAN subsystem.

7. A method for setting a computer system over a network to boot to a first or second remote boot protocol prior to being powered on over the network comprising, providing a remote computer which is coupled to said computer system via a data communication link, said computer system having a communication subsystem for communicating data with said computer system, said communication subsystem being supplied with auxiliary power and being operative to communicate with said computer system regardless of whether said computer system is in a normal operating state, sending a first packet to said computer system via said communication link, said first packet containing a boot parameter which is indicative of said first or second remote boot protocol, storing said boot parameter in a memory of said computer system without powering on to a normal operating state, sending a second packet to said computer system to cause said system to enter a normal operating state, and performing a remote program load in accordance with said boot parameter.

\* \* \* \* \*